United States Patent
Kline et al.

(10) Patent No.: US 10,878,255 B2
(45) Date of Patent: Dec. 29, 2020

(54) PROVIDING AUTOMATIC RESPONSIVE ACTIONS TO BIOMETRICALLY DETECTED EVENTS

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 16/152,770

(22) Filed: Oct. 5, 2018

(65) Prior Publication Data

US 2020/0110946 A1     Apr. 9, 2020

(51) Int. Cl.
| | |
|---|---|
| *G06K 9/00* | (2006.01) |
| *A01K 29/00* | (2006.01) |
| *G05D 1/00* | (2006.01) |
| *H04N 5/232* | (2006.01) |
| *G08B 21/18* | (2006.01) |
| *G05D 1/02* | (2020.01) |

(52) U.S. Cl.
CPC ........ *G06K 9/00805* (2013.01); *A01K 29/005* (2013.01); *G05D 1/0011* (2013.01); *G05D 1/0231* (2013.01); *G08B 21/182* (2013.01); *H04N 5/23296* (2013.01); *H04N 5/23299* (2018.08); *G05D 2201/0207* (2013.01)

(58) Field of Classification Search
None
See application file for complete search history.

(56) References Cited

U.S. PATENT DOCUMENTS

| | | | |
|---|---|---|---|
| 7,868,912 B2 | 1/2011 | Venetianer et al. | |
| 2003/0075642 A1* | 4/2003 | Silansky | G01W 1/08 244/30 |
| 2007/0095304 A1* | 5/2007 | Rosenberg | A01K 29/00 119/720 |

(Continued)

OTHER PUBLICATIONS

Bashir et al.; IEEE Fifth International Conference on Advanced Video and Signal Based Surveillance; "Video Surveillance for Biometrics: Long-Range Multi-Biometric System"; Dated: 2008; Retrieved: Sep. 27, 2018; 8 pages.

(Continued)

*Primary Examiner* — Mohammed Rachedine
(74) *Attorney, Agent, or Firm* — Cantor Colburn LLP; Tihon Poltavets (57) ABSTRACT

Methods, systems, and computer program products for providing automatic responsive actions to biometrically detected events are provided. Aspects include receiving, from a biometric sensing device associated with an animal, biometric data associated with the animal and animal location data associated with the animal. Aspects also include determining an intensity level of an event associated with the animal based on the biometric data and approximating a location of the event based on the animal location data and the biometric data. In response to determining that the intensity level of the event exceeds a predetermined intensity threshold, aspects include initiating a responsive action proximate to the location of the event.

17 Claims, 6 Drawing Sheets

(56) References Cited

U.S. PATENT DOCUMENTS

| | | | | |
|---|---|---|---|---|
| 2008/0163671 A1* | 7/2008 | Dugan | ............... | G01N 33/0073 73/23.34 |
| 2009/0219387 A1 | 9/2009 | Marman et al. | | |
| 2014/0071886 A1* | 3/2014 | Monte | ................ | H04B 7/18536 370/316 |
| 2015/0237834 A1* | 8/2015 | Schab | .................. | A61D 17/008 340/573.3 |
| 2016/0308859 A1 | 10/2016 | Barry et al. | | |
| 2018/0263220 A1* | 9/2018 | Schab | .................. | G08B 21/182 |

OTHER PUBLICATIONS

Disclosed Anonymously; IP.com; "A method to augment cellular device information with video surveillance data to provide better forensic analysis"; Dated: May 29, 2012; Retrieved: Sep. 17, 2018; 2 pages.

Disclosed Anonymously; IP.com; "Advanced Video Management Systems"; Dated: Dec. 22, 2009; Retrieved: Sep. 17, 2018; 21 pages.

Disclosed Anonymously; IP.com; "Method and System for Video Surveillance Data Storage Optimization"; Dated: Jan. 6, 2017; Retrieved: Sep. 17, 2018; 5 pages.

Hanlon, Mike; https://newatlas.com/author/mike-hanlon/; "New security alert tracking system monitors the vital signs of all employees and reports wirelessly"; Dated: Mar. 9, 2007; Retreived: Sep. 26, 2018; 2 pages.

http://www.hertasecurity.com/en/products/biosurveillance; "BioSurveillance"; Dated: 2016; Retreived: Sep. 26, 2018; 3 pages.

http://www.neurotechnology.com/sentiveillance.html; "SentiVeillance SDK Face identification and movement tracking for video surveillance systems"; Dated: 2018; Retreived: Sep. 26, 2018; 5 pages.

Markland, Dave; https://www.hendonpub.com/law_and_order/articles/2016/09/the_connected_police_car; "The Connected Police Car"; Dated: 2018; Retrieved: Sep. 26, 2018; 8 pages.

http://www.ip.philips.com/licensing/program/115; "Accurate contactless pulse and breathing rate measurement"; Dated: 2014; Retrieved: Sep. 26, 2018; 3 pages.

* cited by examiner

PROVIDING AUTOMATIC RESPONSIVE ACTIONS TO BIOMETRICALLY DETECTED EVENTS

BACKGROUND

The present invention generally relates to event detection and response, and more specifically, to providing automatic responses to biometrically detected events.

Generally speaking, animals have different and often superior sensory abilities as compared to humans. For example, dogs are well-known for having a superior sense of smell, many birds have exceptional vision as well as an aerial vantage point that allows them to see far and wide, elephants can detect seismic waves, various animals have excellent hearing, and some animals can detect electric and/or magnetic fields or other such quantities. Accordingly, animals may be more adept than humans at detecting events, and in particular threat events, such as predators, intruders, environmental threats, or other such potential dangers, particularly in areas having terrain that may be too difficult to navigate. However, obtaining useful information about events from animals is a difficult task.

SUMMARY

Embodiments of the present invention are directed to a computer-implemented method for providing automatic responsive actions to biometrically detected events. A non-limiting example of the computer-implemented method includes receiving, from a biometric sensing device associated with an animal, biometric data associated with the animal and animal location data associated with the animal. The method includes determining an intensity level of an event associated with the animal based on the biometric data. The method includes approximating a location of the event based on the animal location data and the biometric data. In response to determining that the intensity level of the event exceeds a predetermined intensity threshold, the method further includes initiating a responsive action proximate to the location of the event.

Embodiments of the present invention are directed to a system for providing automatic responsive actions to biometrically detected events. The system includes a memory having computer readable computer instructions, and a processor for executing the computer readable instructions. The computer readable instructions include instructions for receiving, from a biometric sensing device associated with an animal, biometric data associated with the animal and animal location data associated with the animal. The computer readable instructions also include instructions for determining an intensity level of an event associated with the animal based on the biometric data and approximating a location of the event based on the animal location data and the biometric data. In response to determining that the intensity level of the event exceeds a predetermined intensity threshold, the computer readable instructions include instructions for initiating a responsive action proximate to the location of the event.

Embodiments of the invention are directed to a computer program product for providing automatic responsive actions to biometrically detected events. The computer program product includes a computer readable storage medium having program instructions embodied therewith. The computer readable storage medium is not a transitory signal per se. The program instructions are executable by a processor to cause the processor to perform a method. A non-limiting example of the method includes receiving, from a biometric sensing device associated with an animal, biometric data associated with the animal and animal location data associated with the animal. The method includes determining an intensity level of an event associated with the animal based on the biometric data. The method includes approximating a location of the event based on the animal location data and the biometric data. In response to determining that the intensity level of the event exceeds a predetermined intensity threshold, the method further includes initiating a responsive action proximate to the location of the event.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
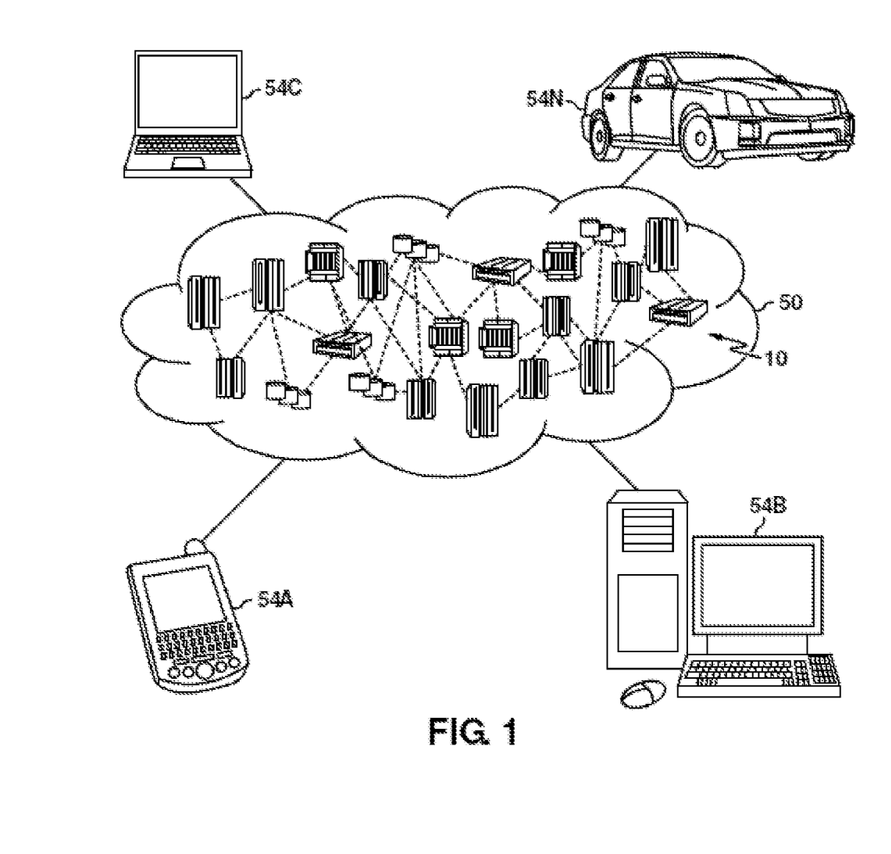
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
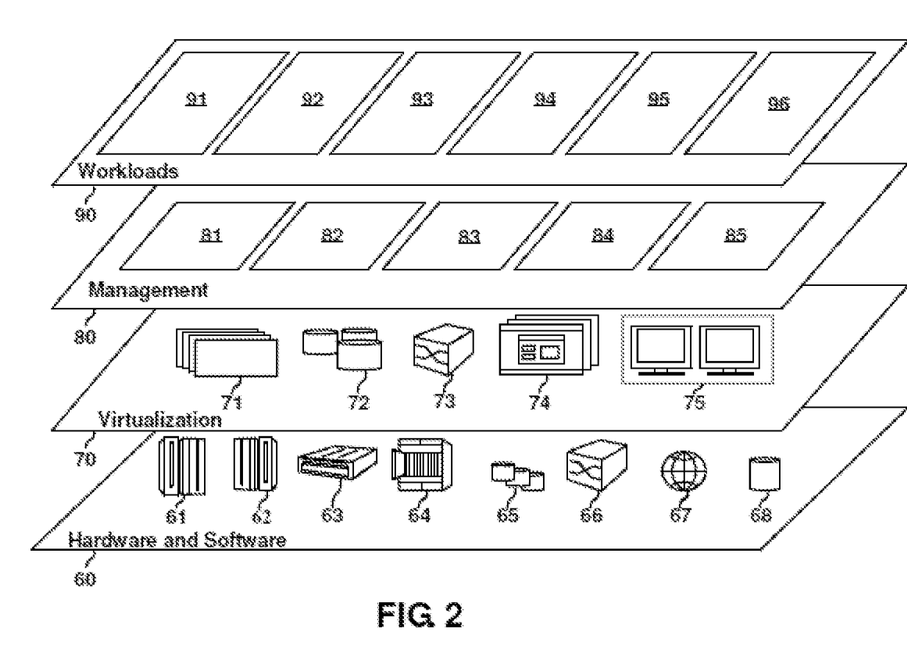
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing automatic responses to biometrically detected events 96.

Figure 3:
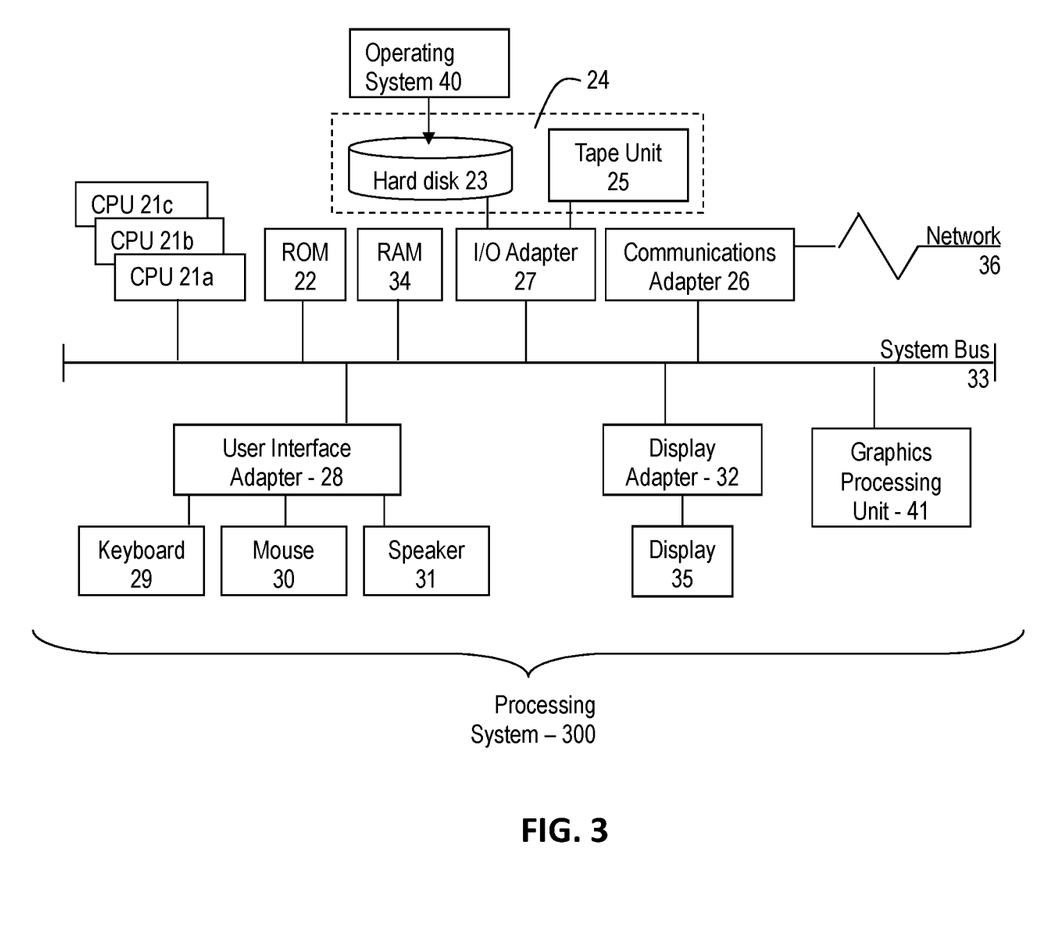
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a system for providing automatic responsive actions to biometrically detected events is provided. In exemplary embodiments, one or more animals are outfitted with one or more biometric sensing devices that can be used to obtain biometric readings such as heart rate, blood pressure, respiratory rate, chemical/biochemical compound detection (e.g., detection of increased adrenaline or other such compound) pH detection, movement (e.g., speed, direction), gestures, sounds (e.g., pitch, loudness, tone, etc.), brain activity, pupil dilation, and any other biometric quantity that may provide an indication that the animal is observing, experiencing or otherwise detecting an event. Such biometric sensing devices may be fitted to wild and/or domestic animals and are capable of wirelessly transmitting data to a back-end server via a network. Biometric sensing devices can include location sensors (e.g., GPS) that may also determine and track the location of the animal in relation to the biometric signals of the animal. In various embodiments, the system may collect the biometric data and location data for use in identifying the existence of an event and classifying or identifying the nature of the event. The system may determine an intensity level of an event based on the biometric data. For example, in some embodiments, the system may determine that an event has a high-intensity level if one or more of the biometric readings exceed normal levels for the animal in an uneventful state by a significant amount. For example, if a particular animal is known to have a heart rate that generally stays within a particular range (i.e., a "normal range") while the animal is stationary and the heart rate suddenly increases above the normal range, this may provide an indication that a predator or some other threat is in the area, which may be considered a high-intensity event. In some embodiments, determining the intensity level of the event based on the biometric data may vary from animal to animal as different animals may have different reactions to different events. According to some embodiments, such determinations may be made using statistical analysis (e.g., an increase of a biometric metric of more than one standard deviation above a normal range may represent a medium level intensity of the event whereas an increase of a biometric metric of more than two standard deviations above a normal average may represent a high-intensity event), based on user input thresholds, based on machine learning techniques, or based on any other such technique that may be suitable for determining an animal's level of fear or excitement. Further, in some embodiments, an intensity level of an event may be determined based on or in response to a user input from, for example, a user that has examined the biometric signals of the animal gathered by the system. The system may also determine an approximate location of the event based on the animal's location data and biometric data. For example, if the animal shows an abnormally high resting heart rate at a first location and then moves to a second location where the animal's resting heart rate returns to normal, the system may determine that there is an event at the first location. In response to determining that the intensity level of the event exceeds a predetermined threshold, the system may initiate a responsive action proximate to the location of the event. For example, the system may remotely access an image capture device near the location of the event and cause the image capture device to pan and/or zoom in on the location, the system may launch an autonomous vehicle with sensors to investigate the location, and/or the system may provide alerts, notifications, or other data to user devices of people in the vicinity of the location.

In some embodiments, the system may also classify the event based on the biometric data of one or more animals. In general, a particular animal may have a first biometric response to a first type of event and a second biometric response to a second type of event. For example, an elephant may have an increased heart rate and may make a loud noise upon seeing a predator but stand its ground, while the elephant may have an increased heart rate and may begin to walk briskly or run upon detecting a seismic event such as a tsunami or earthquake. According to some embodiments, the system may classify an event based on the biometric data received from one or more animals. Event classification may be achieved by profiling typical biometric responses and response patterns of different types of animals to different types of events. Animal profiles that reflect the correlation between biometric response patterns of particular types animals to particular types events may be known (i.e., user input) or derived via techniques such as machine learning, which can automatically derive relationships and correlations by analyzing example data. Further event classification may be achieved by the collective analysis of the biometric responses of different types of animals within the same geography of the event. For example, if many different types of animals all begin to suddenly move in the same direction, this may be indicative of an environmental event such as an impending tsunami or earthquake, whereas if only one type of animal reacts in this way it may indicate a different type of event (e.g., if gazelles start running while elephants remain relatively stationary, it may indicate the presence of a predator that threatens gazelles but not elephants). In some embodiments, event classification may also be based on known animal behavior patterns in relation to external factors such as the time of day, the season, the weather, or the like, such as seasonal mating cycles, feeding times, introduction of new animals into the area, and the like. According to various embodiments, event classification may be based on animal response profiles that are user input or determined using machine learning techniques. In addition to classifying an event, the location of the event may also be more precisely determined based on the locations and corresponding biometric responses of multiple animals in the vicinity of the event.

Figure 4:
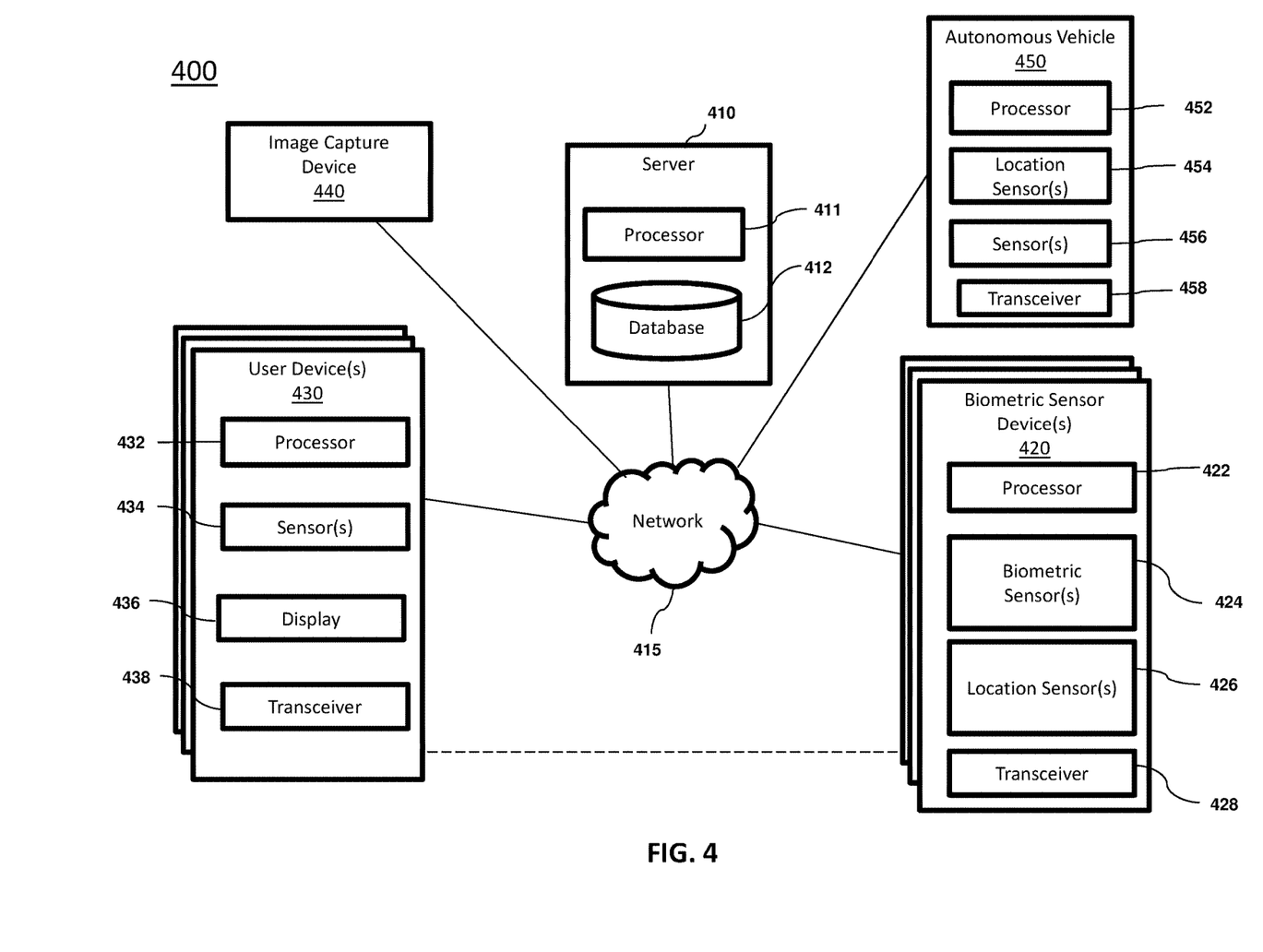
FIG. 4 depicts a system for providing automatic responses to biometrically detected events that may be implemented according to one or more embodiments of the present invention.

Turning now to FIG. 4, a system 400 for providing automatic responsive actions to biometrically detected events will now be described in accordance with an embodiment. The system 400 includes a server 410 in communication with biometric sensor devices 420, user devices 430, image capture device 440 and autonomous vehicle 450 via a communications network 415. According to some embodiments, aspects of system 400 may be implemented using the processing system 300 shown in FIG. 3 and/or the cloud computing environment 50 depicted in FIGS. 1 and 2. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.). The biometric sensor devices 420 are configured to obtain biometric readings from an animal (or human) and location data and transmit such data to server 410.

In exemplary embodiments, the server 410 can include a processor 411 and a database 412. The processor 411 receives biometric data associated with one or more animals and location data associated with one or more animals from biometric sensor devices 420 and determines an intensity level of an event associated with one or more animals based on the biometric data. Processor 411 also approximates a location of the event based on the location data and the biometric data associated with the one or more animals. Database 412 may store historical location and biometric data for a plurality of animals and their respective biometric sensor devices 420. Processor 411 may access this historical data in concert with receiving new biometric and location data to make determinations about changes in biometric signals and locations of an animal. For example, processor 411 may determine a "normal range" of biometric readings for a given animal based on accumulated past biometric data and then can determine whether newly received biometric data represents a significant departure from the normal range to determine an intensity level of an event. In response to determining one or more conditions are met, processor 411 may initiate one or more responsive actions, either proximate to or remote from the location of the event. For example, in some embodiments, if processor 411 determines that the intensity level of a particular event exceeds a specified threshold, the processor 411 may remotely access an image capture device 440 proximate to the location of the event and cause the image capture device 440 to change some aspect, such as but not limited to its angle, focus, frame rate, resolution, zoom, panning speed, or panning direction in relation to the location of the event. For example, processor 411 could cause image capture device 440 to automatically zoom in on the location of the event and increase its frame rate to obtain higher quality images. Likewise, in some embodiments, processor 411 could remotely access autonomous vehicle 450 and cause the autonomous vehicle 450 to navigate to the location of the event while remotely controlling sensors 456 (e.g., camera, microphone) of the autonomous vehicle 450 to obtain data on the event.

According to some embodiments, processor 411 may execute software to classify an event. For example, processor 411 may classify an event as one or more of an intruder presence, a seismic event (e.g., an earthquake, a tsunami), an environmental event (e.g., a fire, a storm, a meteor), or a physical danger. It should be understood that these classifications are merely exemplary and any number of different classifications may be used by the system. Processor 411 may classify an event based on the biometric data of one or more animals. For example, certain types of animals may have a known biometric and/or behavioral response to a given event and processor 411 may classify an event based on the biometric response corresponding to a known pattern or signal. For example, the motion, heart rate, and adrenaline levels of a particular animal may generally follow a particular pattern when a certain type of predator is in the area. In some cases, certain animals (e.g., monkeys, birds, whales) may make particular sounds tantamount to a "word" that may identify the nature of an event such that the processor 411 may classify the event based on sound data. Further, different types of animals may have different known responses to a given type of event, and as such, processor 411 may utilize biometric data from multiple different animals in the vicinity of the event in order to classify the event. In some embodiments, event classifications may be made, modified or refined based on sensor data (e.g., video data) that is obtained from, for example, image capture device 440 or autonomous vehicle 450. For example, server 410 may analyze a video feed and may identify an event using image recognition techniques. Furthermore, in some embodiments, classifications may be user input in response to a human operator viewing sensor data (e.g., live video feed).

According to some embodiments, processor 411 may utilize event classifications to generate alerts or notifications and to determine a range or area near the event within which to notify people. For example, if processor 411 classifies an event as being a predator and more particularly a tiger being in the area, processor 411 may generate an alert warning of the tiger's presence and transmit the alert to user devices 420 that are within a 1-mile radius of the approximated location of the tiger. By contrast, if processor 411 classifies the event as a tsunami, processor 411 may send alerts to all user devices 420 within 5 miles of the coast nearest to the event location. In this way, alerts can be tailored to the types of events that are being detected by the system 400 and can be configured to only be sent to users who may be affected by the event. According to some embodiments, processor 411 may utilize event classifications to determine a particular responsive action to initiate. For example, if an event classification is determined to be a tornado, processor 411 may generate and send alerts and remotely access an image capture device 440, but may decide not to launch an autonomous vehicle 450 because there is too great of a risk of damage to the vehicle 450 given the nature of the event.

In exemplary embodiments, the biometric sensor devices 420 can include, but are not limited to, a device that can be attached to or disposed about a body of an animal (e.g., a collar, a wristband, etc.), an ingestible device, an implantable device, or a remote device that is capable of obtaining biometric readings (e.g., a remote camera and/or microphone capable of picking up biometric readings) and may include all or some of the elements of processing system 300 shown in FIG. 3. Further, particularly in the case of domestic animals (i.e., pets) or worker animals (e.g., seeing-eye-dog), biometric sensor devices 420 may also be disposed about or incorporated into other equipment, such as a sensor incorporated into a leash or rope attached to a dog that may provide an indication of the dog's movement or excitation by measuring the force exerted on the leash/rope by the dog. A biometric sensor device 420 includes a processor 422, one or more biometric sensors 424, one or more location sensors 426, and a transceiver 428. The biometric sensors 424 can monitor one or more biometric signals of an animal associated with the biometric sensor device 420, such as but not limited to heart rate, blood pressure, respiratory rate, chemical/biochemical attributes (e.g., detection of increased adrenaline or other such compound), movement (e.g., speed, direction), gestures, sounds (e.g., pitch, loudness, tone, etc.), brain activity, pupil dilation, and any other biometric quantity that may provide an indication that the animal is observing, experiencing or otherwise detecting an event. The location sensors 426 can be capable of detecting the location of the associated animal using, for example, one or more of GPS (global positioning system), triangulation of Wi-Fi or cellular signals, or any other such known methods of determining a location of a device. The processor 422 receives the biometric data from biometric sensors 424 and location data from location sensors 426 and can determine changes in both biometric signals and the animal's location. Transceiver 428 can transmit both biometric data and location data to network 415 and/or user device(s) 430. According to some embodiments, data can be transmitted by biometric sensor device(s) 420 continuously, intermittently, or in response to a predetermined condition. For example, in some embodiments, a biometric sensor device 420 may only transmit biometric data upon processor 422 determining that there has been a significant change in a biometric reading that, for example, represents an intensity level of an event that exceeds a specified threshold as described herein. Similarly, in some embodiments, a biometric sensor device 420 may transmit location data upon processor 422 determining that there has been a significant change in the location of the animal by, for example, determining that the animal has moved beyond a predetermined threshold distance from a previously reported location. Although this disclosure is generally directed to obtaining biometric data from animals, it is contemplated that the systems and methods herein may also utilize biometric data similarly obtained in association with humans, insects, or any other biological creatures as may be appropriate.

In exemplary embodiments, user devices 430 can include, but are not limited to, a smartphone, a wearable device such as a smartwatch, a tablet, a computer system such as the one shown in FIG. 3, a smart speaker, a television, or any other suitable electronic device. The user device 430 includes a processor 432, one or more sensors 434, a display 436, and a transceiver 438. Sensors 434 may include but are not limited to a microphone, a gyroscope, a location sensor (e.g., GPS), and a camera. The sensors 434 can be used to detect the location of user device 430 in at least a manner similar to that of location sensors 426 of biometric sensor devices 420. The transceiver 438 can allow a user device 430 to communicate with other devices (e.g., server 410) via network 415 and may allow the user device 430 to communicate directly with biometric sensor devices 420 or other nearby devices. The processor 432 may receive location data from a location sensor of sensors 434 and determine the location of the user device 430. The processor 432 may also execute software to allow user device 430 to display images or a video feed from another device (e.g., image capture device 440, autonomous vehicle 450) via display 436 and can, for example, execute software that may allow a user of user device 430 to take remote control of another device providing the video feed to manipulate the angle of the image and other image features (e.g., zoom, frame rate, filters, etc.). Display 436 may also display alerts, notifications, or other information relating to events that are sent to user device 430 (e.g., by server 410). In some embodiments, if the system determines that a user device 430 is located within a vicinity of an event, the system (e.g., server 410) may be configured to remotely activate one or more sensors 434 (e.g., camera, microphone) of user device 430 to obtain more information about an event. For example, if the system classifies an event as a fire and a user device is determined to be in the vicinity of the fire, the system (e.g., 410) may activate a camera, a microphone, and a heat sensor of the user device to obtain more information on the fire. In some embodiments, the system can be configured to transmit sensor data obtained from a user device 430 to one or more other user devices 430. For example, in the case of a fire, the system may activate the camera of a first user device 430 and transmit the video feed to a second user device 430 that may be associated with, for example, another user that is located within the predicted future path of the fire.

In exemplary embodiments, image capture device 440 can be a mounted video camera, such as a security camera mounted on a building, a mobile camera with a predictable path such as a satellite camera, or a mobile device such as a camera on a user device 430. It should be understood that these are non-limiting examples and any type of remotely accessible camera or image capture device may be utilized by system 400. In some embodiments, server 410 may store a list of accessible image capture devices 440 with known locations. According to some embodiments, image capture device 440 may have various aspects that may be controlled and adjusted remotely by server 410 and/or user device 430, such as its angle, focus, frame rate, resolution, zoom, panning speed, or panning direction. Image capture device 440 may have available filters or may be able to toggle between different views or frequencies (e.g., night vision, infra-red, thermal vision, etc.).

In exemplary embodiments, autonomous vehicle 450 may include a processor 452, location sensor(s) 454, and sensors 456. The location sensor(s) may be similar to location sensors 426 previously described with respect to biometric sensor device 420 and the sensors 456 may include any type of sensor that may gather information about an event, including, but not limited to an image capture device, a microphone, a heat sensor, a pressure sensor, and electromagnetic sensor, a wind speed sensor, a gyroscope, and the like. Autonomous vehicle 450 may be a ground-based vehicle such as an all-terrain vehicle or may be a flying vehicle such as a quad-copter or the like. Transceiver 458 can allow autonomous vehicle to remotely communicate with server 410 and user devices 430, and processor 452 may execute code to allow server 410 or a remote user of a user device 430 to remotely control and/or manipulate sensors (e.g., camera angle) of autonomous vehicle 450.

Figure 5:
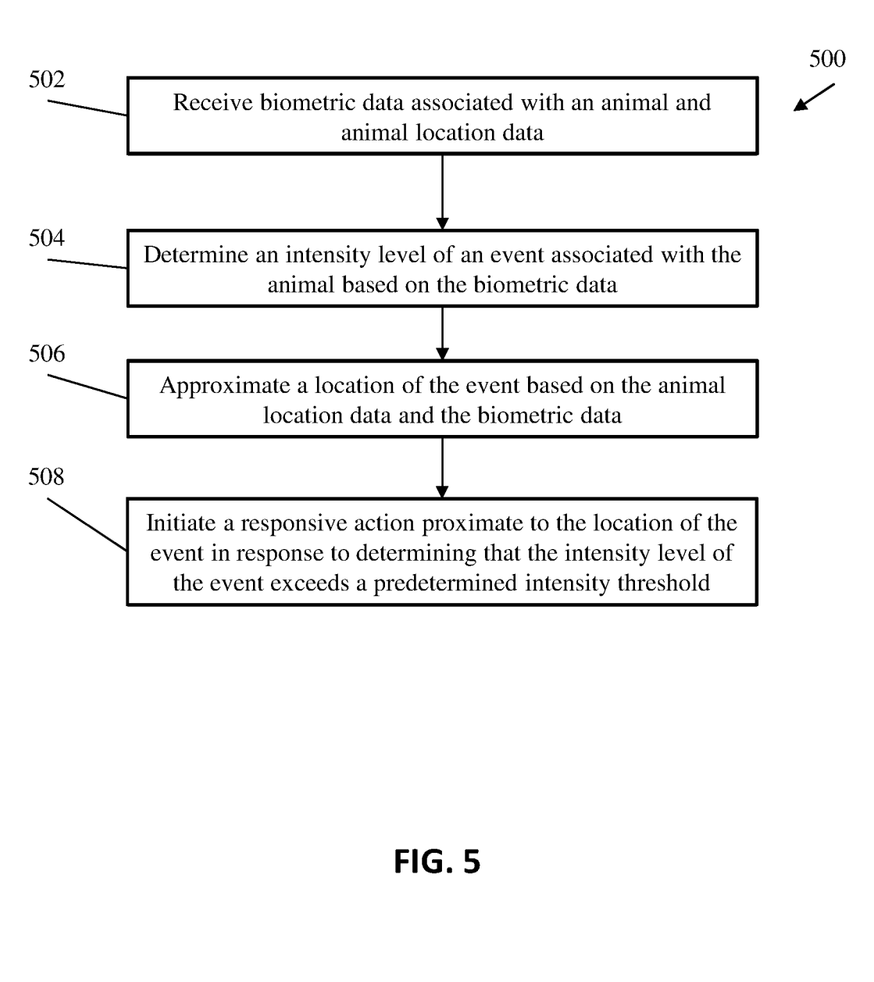
FIG. 5 depicts a flow diagram of a method for providing automatic responsive actions to biometrically detected events according to one or more embodiments of the invention.

Turning now to FIG. 5, a flow diagram of a method 500 for providing automatic responsive actions to biometrically detected events in accordance with an embodiment is shown. The method 500 begins at block 502 and includes receiving (e.g., via server 410) biometric data associated with an animal and location data associated with the animal. For example, the biometric data and location data may be obtained by one or more biometric sensors devices 420 associated with the animal and transmit by biometric sensor device(s) 420 to server 410 (e.g., via network 415). In some instances, biometric data and location data may be relayed to server 410 via one or more user devices 430 that can be directly connected with biometric sensor(s) 420 via, for example, a local wireless connection such as a Bluetooth connection or using near-field communication. According to some embodiments, the system (e.g., server 410) may receive animal biometric and location data from a plurality of sensor devices 420 that are associated with a plurality of different animals. In some embodiments, sensor devices 420 may transmit animal biometric and location data continuously, intermittently, or in response to determining that there has been a significant change in either a biometric reading or location reading. In some embodiments, server 410 may ping one or more biometric sensor device(s) 420 to request updated biometric and/or location data.

Next, as shown in block 504, the method includes determining an intensity level of an event associated with the animal based on the biometric data. In some embodiments, if the biometric data associated with a particular animal falls within normal ranges, the system (e.g., via server 410) may determine that the intensity of an event associated with the animal is low. An event associated with the animal can be an event that is observed, experienced, or otherwise detected by the animal. For example, a low-intensity event may correspond to an animal sleeping, resting, grazing, or engaging in otherwise low-stress behavior. "Normal ranges" of biometric signals refer to biometric readings that represent the animal's condition when the animal is in a relaxed state and/or when there is no significant event (e.g., such as a threat) being observed or experienced by the animal. In some embodiments, such normal ranges may be user input, determined statistically (e.g., by determining average ranges based on past data and/or tracking biometric responses to known events), or may be determined using machine learning techniques. As will be appreciated, such normal ranges may vary based on the type of animal whose biometrics are being observed, as well as variations by individual of the same type of animal. In some embodiments, determining that the intensity of an event can involve examining a single biometric signal (e.g., only heart rate, or only blood pressure, etc.) of an animal, or a combination of different biometric signals (e.g., heart rate and blood pressure) in view normal ranges. In some embodiments, the determination of the intensity of an event can be based on different biometric signals and thresholds for different types of animals and/or environments. According to some embodiments, determination of an intensity of an event may be based on comparing the received animal biometric data to one or more thresholds. For example, a first threshold can represent a first difference between the received biometric data and the associated normal ranges and a second threshold can represent a second difference between the received biometric data and the associated normal ranges, where the second threshold is larger than the first threshold. For example, the first threshold may represent on standard deviation of variance from the normal range or average biometric signal and the second threshold may represent two standard deviations of variance. Alternatively, the first and second thresholds may be specified values (e.g., heart rate exceeds 180 bpm) or have associated durations that must be met to qualify (e.g., heart rate exceeds 180 bpm for at least 2 minutes). In some embodiments, the system may determine that an event has a medium level of intensity if a first threshold is exceeded and a high level of intensity if a second threshold is exceeded. It should be understood that these are merely examples and that the event intensity level may be determined as a score, a category, or any other quantitative format.

As shown at block 506, the system (e.g., server 410) may approximate a location of the event based on the animal location data and the biometric data. For example, if the animal's biometric signals are well above norms, this may indicate that the event is very nearby to the animal. The approximation of the location of the event may change based on the changing biometrics of the animal. For example, if the animal begins to calm down, the system may interpret this is an indication that the event is further away from the animal. According to some embodiments, an approximation of the location of the event may be represented as an area within an radius of an animal, where the size of the radius may be based on the intensity of the event of the animal's biometric signals. In some embodiments, a location may be approximated as being between a plurality of animals based on the biometric signals of a plurality of animals in the same vicinity as one another.

As shown at block 508, the system (e.g., server 410) may initiate a responsive action proximate to the location of the event in response to determining that the intensity level of the event exceeds a predetermined intensity threshold. In some embodiments, a responsive action can include remotely accessing (e.g., by server 410) an image capture device 440 proximate the location of the event and causing the image capture device 440 to change some aspect of its operation based on the location of the event, such as changing the image capture device's 440 angle, focus, frame rate, resolution, zoom, panning speed, or panning direction. In some embodiments, the system may automatically adjust the image capture device 440 to point at the location of the event. For example, if the system determines that a pet dog is very excited or agitated because its heart rate has increased and it is pulling on its leash with great force, the system may automatically focus a nearby security camera on a target area that is indicated by the dog (e.g., a target area might be in front of the dog in the direction in which the dog is attempting to rapidly move). According to some embodiments, the system may automatically adjust the image capture device 440 to point at the animal (or nearby by human) having the elevated biometric response that gave rise to the event intensity exceeding a threshold and may, using image recognition or other such techniques, determine the direction that the animal is looking in and cause the image capture device to automatically pan in a direction that follows the animal's gaze.

In some embodiments, a responsive action can include remotely accessing (e.g., by server 410) autonomous vehicle 450 equipped with sensors 456 (e.g., an image capture device) and causing the autonomous vehicle 450 to move to a location proximate the location of the event to, for example, obtain images or other sensor data of the location of the event. A responsive action can include transmitting a video and/or audio feed of a remote image capture device 440 or autonomous vehicle 450 to a user device 430. For example, if a pet dog that is outfit with a biometric sensor device 420 reacts to an event that is classified as being an intruder in a location that is approximated to be a portion of a backyard, the system can automatically access a security camera on the back of the house and point it towards the approximate location of the intruder and then transmit the camera feed to a user device 430 associated with an occupant of the house. In some embodiments, the system (e.g., server 410) may further facilitate control of a remote image capture device 440 or autonomous vehicle 450 by a user of a user device 430. For example, after transmitting the video feed of a security camera to a user device 430 associated with an occupant of the house under threat of an intruder in the yard, the system may allow the occupant of the house to take control of the security camera (e.g., image capture device 440) to, for example, change the angle, zoom, filter, or other aspects of the video feed in order to remotely investigate yard and locate the intruder if necessary. In some embodiments, where the animal may be a trained animal such as a seeing-eye-dog, a responsive action may include transmitting alerts to a user device 430 associated with the animal that indicate specific dangers, such as, for example, an upcoming crosswalk, an impediment to walking, a threatening individual, or the like. In such cases, the processing to determine the intensity and/or classification of the event may be performed by either the biometric sensor device 420 or the user device 430 and the biometric sensor device 420 may communicate directly with the user device 430 (i.e., without utilizing network 415).

In some embodiments, a responsive action can include determining, based on location data received from one or more user devices 430, one or more users that are within a predetermined distance threshold of the location of the event and transmitting an alert to the corresponding users to notify them of the event. In some embodiments, the predetermined distance threshold may be based on the intensity of the event. For example, events with a very high intensity may have a larger predetermined distance threshold than events with a lower intensity. In some embodiments, the predetermined distance threshold may be based on a determined classification of the event. For example, a predetermined distance threshold hold may be smaller for an event that is classified as being a predator than if the event is classified as being a tsunami.

According to some embodiments, method 500 may further include receiving user location data associated with one or more users from one or more user devices 430, identifying based on the animal location data and the user location data, one or more nearby users, wherein a nearby user comprises a user that is located within a predetermined distance threshold of the location of the event, and transmitting, to one or more user devices of nearby users, an alert associated with the event. In some embodiments, the method may further include determining a classification of an event associated with the animal based on the biometric data. According to some embodiments, the predetermined distance threshold can be based on the classification of the event. According to some embodiments, a classification of an event may include one or more of a predator presence (e.g., indicating the proximity and/or type of predator), a human presence, an intruder presence, a seismic event, an environmental event, a physical danger, or any other type of event that may be identified via analysis of biometric data obtained from one or more animals. Further, classification of event may include determining whether the event is a local event (e.g., a nearby predator) or a potentially widespread event (e.g., a seismic event).

In some embodiments of method 500, the animal is a first animal and the biometric sensing device is a first biometric sensing device 420 and the method further includes receiving biometric data and animal location data associated with one or more respective second animals from one or more second biometric sensing devices 420 associated with the one or more respective second animals. Approximating the location of the event may be further based on the biometric data and the animal location data associated with the one or more respective second animals. In other words, an initial approximation of the event location may be determined based on data from a first animal and the approximation of the location of the animal may be updated and/or refined based on data received in association with one or more other animals in the vicinity of the event. In some embodiments, the first animal may be a different type of animal than the one or more second animals.

Figure 6:
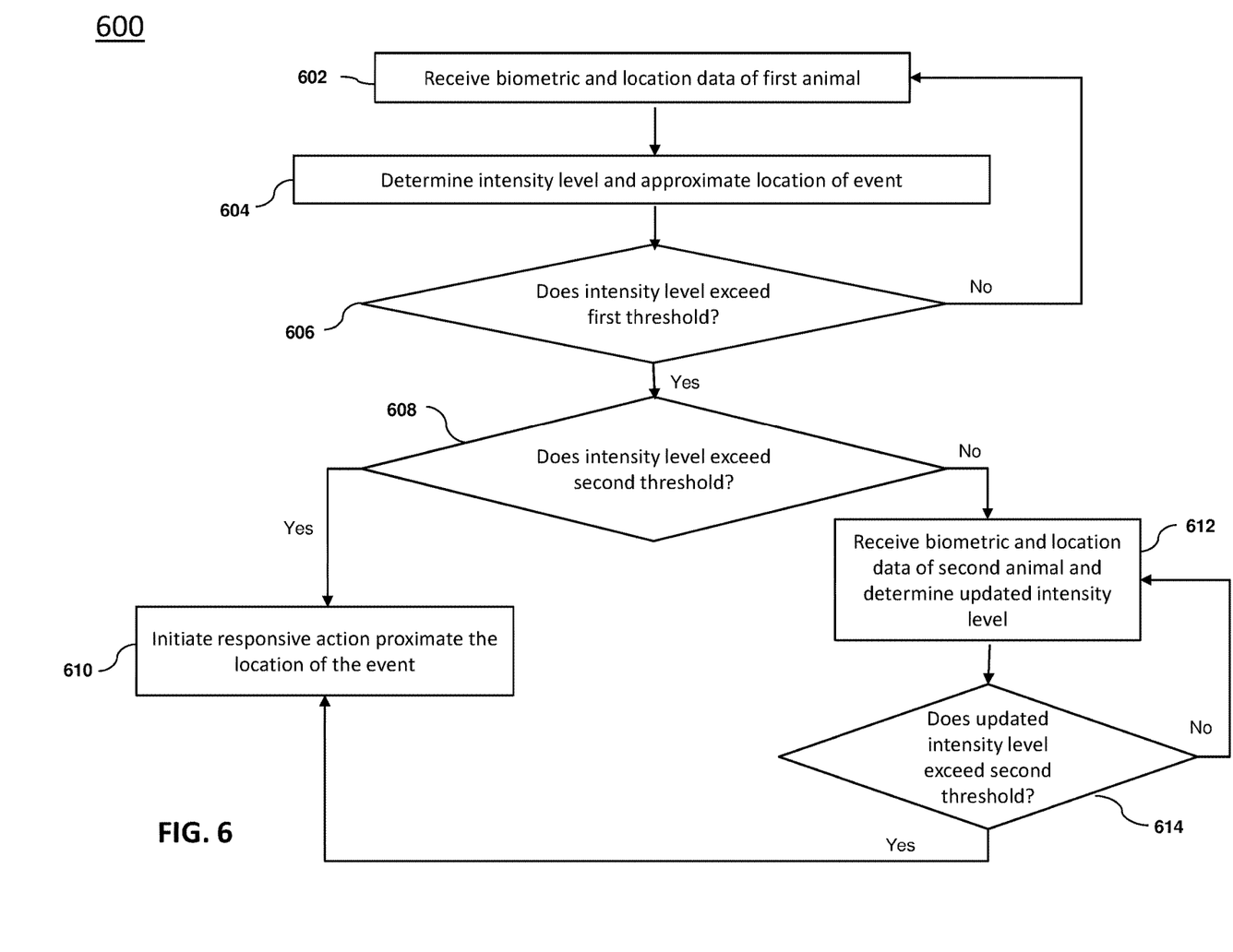
FIG. 6 depicts a flow diagram of a method for providing automatic responsive actions to biometrically detected events based on multiple thresholds according to one or more embodiments of the invention.

Turning now to FIG. 6, a flow diagram of a method 600 for providing automatic responsive actions to biometrically detected events based on multiple thresholds in accordance with an embodiment is shown. The method begins at block 602 and includes receiving biometric and location data of a first animal. Next, as shown at block 604, the method 600 includes determining an intensity level and approximate location of an event associated with the first animal. Receiving biometric and location data, determining the intensity level of an event and approximating the location of the event may all be performed in a manner similar to those that described above with respect to FIG. 5.

At block 606, the system determines whether the intensity level of the event exceeds a first threshold. According to some embodiments, if the intensity level of the event does not exceed the first threshold, then the system reverts to block 602 where it continues to receive new biometric and location data from the first animal. According to some embodiments, if the system determines that the intensity level of the event does exceed the first threshold, then the method proceeds to block 608 where the system then determines if the intensity level of the event exceeds a second threshold. As described herein, the first and second threshold may be based on the type of animal the first animal is (e.g., dog, bird, elephant) and may be user-input, determined statistically (e.g., the first threshold may represent a first degree of variance from normal biometric signal levels and the second threshold can represent a second, greater degree of variance from normal biometric signal levels), or automatically determined by the system using machine learning techniques. According to some embodiments, the first threshold can represent a degree of event intensity that rises above random noise and the second threshold can represent a degree of event intensity that clearly indicates that a significant event is occurring. In other words, if the second threshold is exceeded, it can represent that there is a high likelihood that an event that may be of interest to humans in the area is occurring (e.g., a predator, an environmental danger, or some other danger is present), whereas exceeding the first threshold may represent that there may be a significant event occurring, but it is uncertain. For example, if an animal suddenly starts running, this may generate some biometric signals that are above normal levels (e.g., heart rate), which may exceed the first threshold. But, it may be unclear if a significant event is occurring based on exceeding the first threshold alone. For example, the animal may be running from a predator, which may indicate a significant event, or the animal may be simply exercising, playing (e.g., fetching a ball or playing with other animals), or hunting small prey, which may not be significant events.

Accordingly, in some embodiments, if the system determines that the intensity level of the event exceeds the second threshold, the method 600 may proceed to block 610 where the system initiates one or more responsive actions proximate to the location of the event (e.g., sends alerts to user devices 430 near the event, remotely accesses an image capture device 440, or launches an autonomous vehicle 450). However, if the system determines that the intensity level of the event does not exceed the second threshold, in some embodiments the method 600 may proceed block 612 where the system (e.g., server 410) receives biometric and location data associated with a second animal (e.g., from a second biometric sensor device 420) and determines an updated intensity level of the event. The system (e.g., server 410) may store such biometric and location data upon receipt for future use. According to some embodiments, the system (e.g., server 410) may determine one or more animals that are in the vicinity of the first animal-based on last known locations of the animals and may ping the biometric sensor devices 420 associated with those animals to obtain a current location and recent biometric readings. The system (e.g., 410) may then update the intensity level of the event based on the biometric data of the one or more second animals. For example, the system may create an updated intensity level of the event by averaging the respective intensity levels of the event derived from each individual animal's biometric responses. In some embodiments, the system may create a weighted average by giving scores and readings associated with one or more animals more weight based on, for example, the type of animal, the number of readings from the same type of animal in the vicinity, how recent the readings are, or how close to the approximate location of the event each animal is. The system may also update the approximate location of the event based on the biometric and location data received from multiple animals.

As shown in block 614, the system may then determine if the updated intensity level exceeds the second threshold, and if it does, method 600 may proceed to block 610 where the system initiates a responsive action. According to some embodiments, if the system determines that the updated intensity level does not exceed the second threshold, the system may simply continue to receive updated biometric data and location data from the one or more second animals and/or the first animal. According to some embodiments, the system may continue to receive data from the first and second animals until the updated intensity level drops below the first threshold. In some embodiments, in block 614 the system may alternatively determine if the updated intensity level exceeds a third threshold where the third threshold is automatically determined based on the types of the second animals. It should be understood that a "threshold" represents a multi-faceted quantity in the sense that there may be various combinations of readings that may aggregate to collectively exceed a threshold, even though a single biometric aspect may not display significant changes. For example, for each animal, an intensity of an event may be determined by combining weighted scores of different biometric aspects (e.g., adrenaline increases may be more heavily weighted than increases in heart rate), where the weightings may differ based on the type of animal, the location, the time of day or any other number of factors.

Additional processes may also be included. It should be understood that the processes depicted in FIGS. 5 and 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, from a biometric sensing device associated with an animal:
      biometric data associated with the animal; and
      animal location data associated with the animal;
   determining, based on the biometric data, an intensity level of an event associated with the animal;
   approximating, based on the animal location data and the biometric data, a location of the event; and
   responsive to determining that the intensity level of the event exceeds a predetermined intensity threshold, performing a responsive action proximate to the location of the event, wherein performing the responsive action comprises:
      receiving, from one or more user devices, user location data associated with one or more users;
      identifying, based on the animal location data and the user location data, one or more nearby users, wherein a nearby user comprises a user that is located within a predetermined distance threshold of the location of the event; and
      transmitting, to one or more user devices of nearby users, an alert associated with the event.

2. The method of claim 1, wherein the event associated with the animal comprises an event that is observed, experienced, or otherwise detected by the animal.

3. The method of claim 1, wherein the responsive action comprises:
   remotely accessing an image capture device proximate the location of the event; and
   causing the image capture device to change one or more of its angle, focus, frame rate, resolution, zoom, panning speed, or panning direction based on the location of the event.

4. The method of claim 1, wherein the responsive action comprises:
   remotely accessing an autonomous vehicle equipped with sensors including an image capture device; and
   causing the autonomous vehicle to move to a location proximate the location of the event and obtain at least images of the location of the event.

5. The method of claim 1, the method further comprising:
   determining, based on the biometric data, a classification of an event associated with the animal, wherein the predetermined distance threshold is based on the classification of the event.

6. The method of claim 5, wherein the animal is a first animal and the biometric sensing device is a first biometric sensing device, the method further comprising:
   receiving, from one or more second biometric sensing devices associated with one or more respective second animals:
      biometric data associated with the one or more respective second animals; and
      animal location data associated with the one or more respective second animals;
      wherein approximating the location of the event is further based on the biometric data associated with the one or more respective second animals and the animal location data associated with the one or more respective second animals.

7. The method of claim 6, wherein the first animal is a different type of animal than the one or more second animals.

8. The method of claim 5, wherein the classification of the event comprises one or more of: a predator presence, a human presence, an intruder presence, a seismic event, an environmental event, or a physical danger.

9. The method of claim 3, further comprising:
   transmitting video feed associated with the image capture device to a user device.

10. A system comprising:
    a processor communicatively coupled to a memory, the processor configured to:
    receive, from a biometric sensing device associated with an animal:
       biometric data associated with the animal; and
       animal location data associated with the animal;
    determine, based on the biometric data, an intensity level of an event associated with the animal;
    approximate, based on the animal location data and the biometric data, a location of the event;
    responsive to determining that the intensity level of the event exceeds a predetermined intensity threshold, perform a responsive action proximate to the location of the event, wherein performing the responsive action comprises:
       receiving, from one or more user devices, user location data associated with one or more users;
       identifying, based on the animal location data and the user location data, one or more nearby users, wherein a nearby user comprises a user that is located within a predetermined distance threshold of the location of the event; and
       transmitting, to one or more user devices of nearby users, an alert associated with the event.

11. The system of claim 10, wherein the responsive action comprises:
    remotely accessing an image capture device proximate the location of the event; and
    causing the image capture device to change one or more of its angle, focus, frame rate, resolution, zoom, panning speed, or panning direction based on the location of the event.

12. The system of claim 10, wherein the responsive action comprises:
    remotely accessing an autonomous vehicle equipped with sensors including an image capture device; and
    causing the autonomous vehicle to move to a location proximate the location of the event and obtain at least images of the location of the event.

13. The system of claim 10, wherein the processor is further configured to:

determine, based on the biometric data, a classification of an event associated with the animal, wherein the predetermined distance threshold is based on the classification of the event.

14. The system of claim 13, wherein the animal is a first animal and the biometric sensing device is a first biometric sensing device, the processor further configured to:
receive, from one or more second biometric sensing devices associated with one or more respective second animals:
biometric data associated with the one or more respective second animals; and
animal location data associated with the one or more respective second animals;
wherein approximating the location of the event is further based on the biometric data associated with the one or more respective second animals and the animal location data associated with the one or more respective second animals.

15. A computer program product comprising a computer readable storage medium having program instructions embodied therewith, the program instructions executable by a computer processor to cause the computer processor to perform a method, the method comprising:
receiving, from a biometric sensing device associated with an animal:
biometric data associated with the animal; and
animal location data associated with the animal;
determining, based on the biometric data, an intensity level of an event associated with the animal;
approximating, based on the animal location data and the biometric data, a location of the event;
responsive to determining that the intensity level of the event exceeds a predetermined intensity threshold, performing a responsive action proximate to the location of the event, wherein performing the responsive action comprises:
receiving, from one or more user devices, user location data associated with one or more users;
identifying, based on the animal location data and the user location data, one or more nearby users, wherein a nearby user comprises a user that is located within a predetermined distance threshold of the location of the event; and
transmitting, to one or more user devices of nearby users, an alert associated with the event.

16. The computer program product of claim 15, wherein the responsive action comprises:
remotely accessing an image capture device proximate the location of the event; and
causing the image capture device to change one or more of its angle, focus, frame rate, resolution, zoom, panning speed, or panning direction based on the location of the event.

17. The computer program product of claim 15, wherein the responsive action comprises:
remotely accessing an autonomous vehicle equipped with sensors including an image capture device; and
causing the autonomous vehicle to move to a location proximate the location of the event and obtain at least images of the location of the event.

* * * * *